(12) United States Patent
Bruijns

(10) Patent No.: US 6,906,731 B2
(45) Date of Patent: Jun. 14, 2005

(54) METHOD OF AUTOMATICALLY DETERMINING THE STARTING POINT FOR ANALYSIS OF A DATA SET COMPRISING A TUBULAR STRUCTURE

(75) Inventor: Johannes Bruijns, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 239 days.

(21) Appl. No.: 10/135,821

(22) Filed: Apr. 30, 2002

(65) Prior Publication Data

US 2002/0188358 A1 Dec. 12, 2002

(30) Foreign Application Priority Data

May 1, 2001 (EP) .............................. 01201577

(51) Int. Cl.[7] .............................................. G09G 5/02

(52) U.S. Cl. ..................................................... 345/642

(58) Field of Search ............................... 382/128, 131, 382/130; 700/98; 345/642

(56) References Cited

U.S. PATENT DOCUMENTS

2002/0136440 A1 * 9/2002 Yim et al. ................... 382/131
2003/0053697 A1 * 3/2003 Aylward et al. ............ 382/203

FOREIGN PATENT DOCUMENTS

WO     WO 01/2655 A2 * 4/2001 ............. G06T/7/60
WO     WO 01/26055 A2    4/2001

OTHER PUBLICATIONS

Bruijns, J. "Semi-Automatic Shape Extration from Tube-like Geometry", Xootic Magazine, Jan., 2001.*
Suzuki, Yasuyuki, Direct Measurement of Retinal Vessel Diameter: Comparison with Microdensitometric Methods Based on Fundus Photographs; Survey of Ophthalmology, vol. 39, Supp. 1, May 1995, pp. S57–S65.

* cited by examiner

Primary Examiner—Michael Razavi
Assistant Examiner—Hwa C. Lee
(74) Attorney, Agent, or Firm—Thomas M. Lundin

(57) ABSTRACT

The invention relates to a method of analyzing an object data set comprising points in a multi-dimensional space, in which dataset a tubular structure, such as blood vessels, occurs. The method comprises the following steps:
a) choosing a screen position related to the tubular structure;
b) determining the multi-dimensional co-ordinates of a starting position associated with said screen position;
c) deriving a plane through said starting position having its normal directed to the tubular structure;
d) determining a surface point of the tubular structure as a target position associated with the starting position;
e) selecting a number of points forming part of the surface of the tubular structure in the vicinity of the target position;
f) determining the surface point in the selection which is closest to the plane; and
g) using the surface point determined in the step f) as a new starting position.

Figure 1:
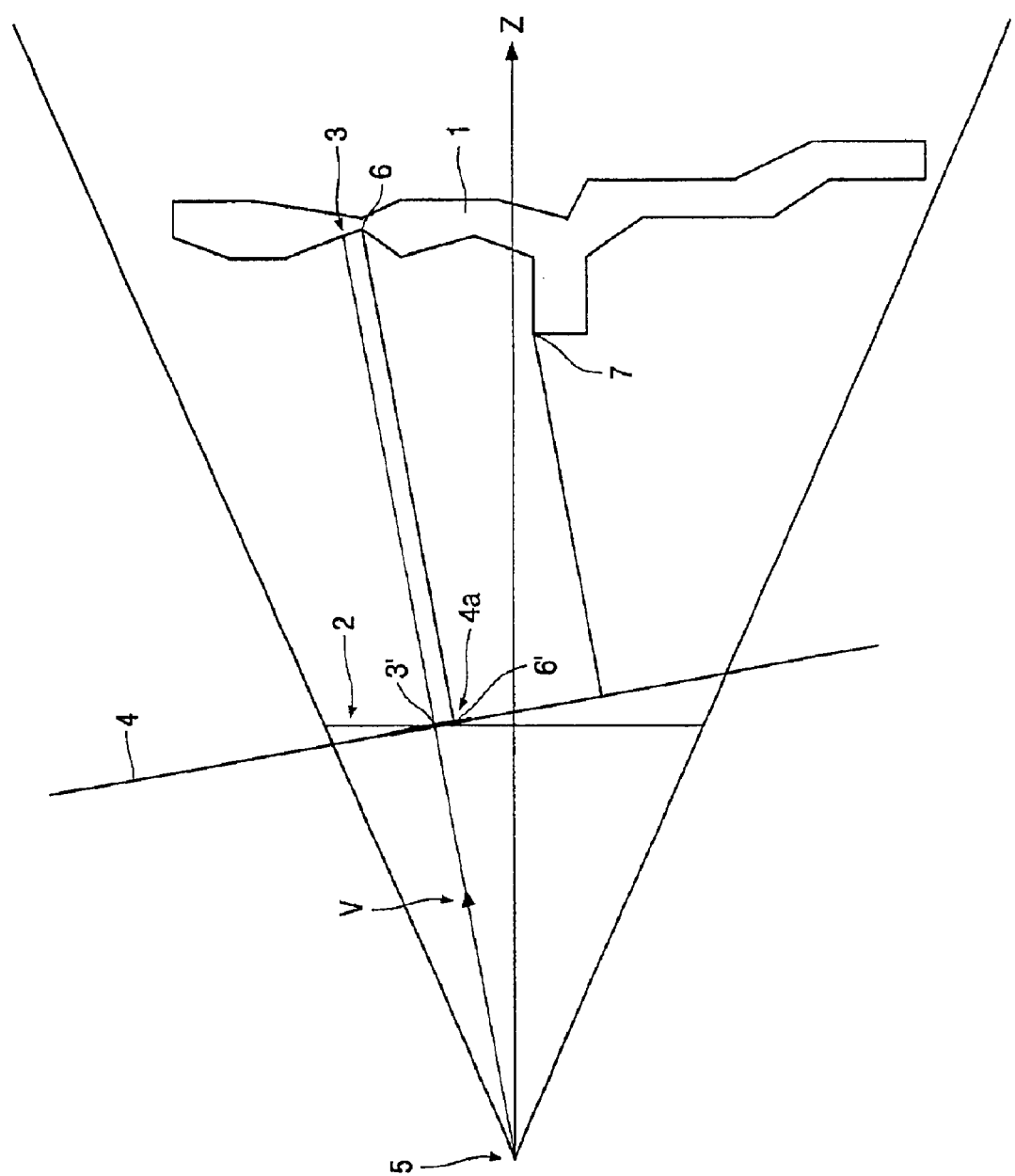

This method allows accurate and reproducible selection of the starting position.

The invention also relates to a computer program to carry out the method according to the invention.

7 Claims, 2 Drawing Sheets

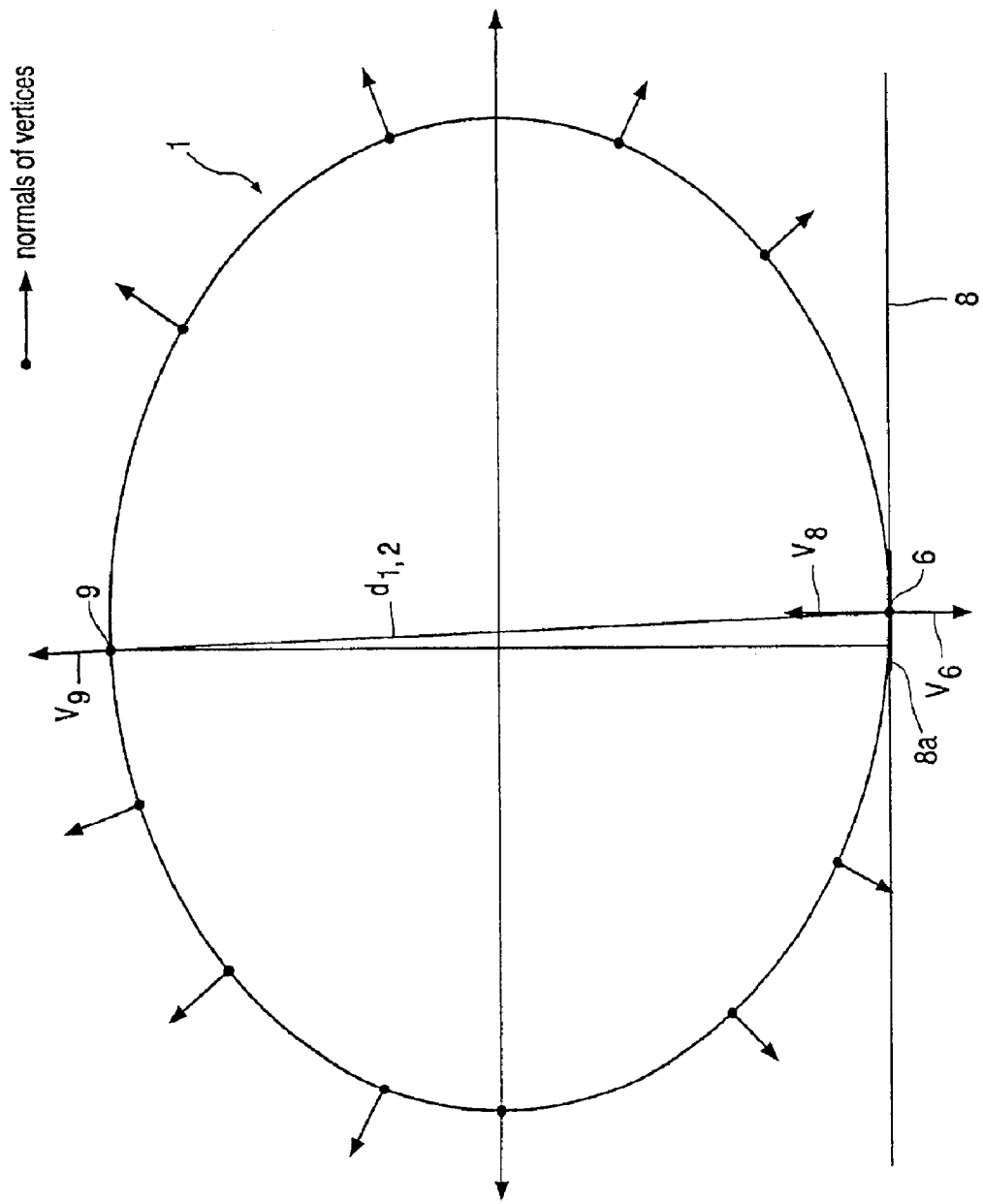

METHOD OF AUTOMATICALLY DETERMINING THE STARTING POINT FOR ANALYSIS OF A DATA SET COMPRISING A TUBULAR STRUCTURE

BACKGROUND

The present invention relates to a method of analyzing an object data set comprising points in a multi-dimensional space, in which data set a tubular structure occurs which is represented on a display screen, said method comprising the following steps:
a) choosing a screen position related to the tubular structure;
b) determining the multi-dimensional co-ordinates of a starting position associated with said screen position;
c) deriving a plane through said starting position having its normal directed to the tubular structure;
d) determining a surface point of the tubular structure as a target position associated with the starting position.

The invention also relates to a computer program to carry out a method of analyzing an object data set comprising points in a multi-dimensional space, in which data set a tubular structure occurs.

The international patent application EP00/09505 of the same applicant relates to a method of the type mentioned above. The method described in the above cited patent application relates in general to the analysis of a tubular structure in a multi-dimensional space. According to this method a self-adjusting probe is defined for analysis of the object data set. The self-adjusting probe comprises a sphere and a plane through the center of the sphere. The sphere should be positioned such that the tubular structure intersects the sphere, that is, at least partially. The plane should be oriented orthogonally to the tubular structure. When oriented correctly the self-adjusting probe enables semiautomatic shape extraction of a tube-like geometry.

Such an object data set represents one or more properties of the object to be examined. The object data set notably relates to the density distribution in the object to be examined; in that case the data values are the local density values of (a part of) the object to be examined. The data values may alternatively relate, for example, to the distribution of the temperature or the magnetization in the object. The multi-dimensional space is usually a three-dimensional space. The data values then relate to a volume distribution of the relevant property, for example, the density distribution in a volume of the object to be examined. The multi-dimensional space may alternatively be two-dimensional. In that case the data values relate to a distribution of the relevant property in a plane through the object, for example, the density distribution in a cross-section through the object.

The object data set can be acquired in a variety of ways. The object data set notably relates to a patient to be examined. Such an object data set can be acquired by means of various techniques such as, for example, 3D X-ray rotational angiography, computed tomography, magnetic resonance imaging or magnetic resonance angiography.

The known method is particularly suitable for analyzing the structure of blood vessels. Several physical characteristics of a blood vessel, such as the diameter thereof, can be determined. Accurate determination of these physical characteristics might be crucial for accurate diagnosis and safe treatment of, for example, a stenosis or an aneurysm.

Currently, at the start of an analysis the user chooses a starting point related to the tubular structure. This is done interactively by means of a pointing device, i.e. by selecting a point on a display screen showing the tubular structure in three views. To obtain an accurate determination of the physical characteristics it is desirable that this starting point is selected accurately and in a reproducible manner.

SUMMARY

It is an object of the invention to provide a method of the type mentioned above which allows for accurate and reproducible selection of the starting position.

This object is achieved by providing a method according to the invention for automatic selection of the starting position based on information on the data set. The method according to the invention, thereto, also comprises the characterizing steps of:
e) selecting a number of points forming part of the surface of the tubular structure in the vicinity of the target position;
f) determining the surface point in the selection which is closest to said plane; and
g) using the surface point determined in step f) as a new starting position.

The method according to the invention has several advantages. First it requires less user interaction, since the user only has to choose a screen position once in a single view of the tubular structure. The resulting starting point to which the self-adjusting probe is moved is always correct and lies on the surface of the tubular structure under analysis. Furthermore, the selection of the starting position is reproducible. Another important advantage is that the speed of operation is enhanced.

A preferred version of the method according to the invention also comprises the steps of:
h) determining a second surface point lying essentially across the first surface point at the opposite side of the tubular structure; and
i) calculating a radius for the sphere based on the first surface point and the second surface point.

According to this version a radius for the sphere of the probe can be automatically calculated based on the data, leading to an accurate and reproducible result. In the method described in the cited international patent application EP00/09505 this act was performed interactively by the user, imposing the disadvantage of requiring a lot of user interaction and hence being inaccurate and time consuming.

The invention also relates to a computer program to carry out any of the methods according to the invention.

DRAWINGS

The invention will be explained in detail with reference to the attached drawings, in which:

FIG. 1 shows a schematic view of a tubular structure under analysis in which a starting point has to be determined by means of the method according to the invention; and FIG. 2 schematically shows a cross section of the tubular structure under analysis whose radius has to be calculated by means of the method according to the invention.

DESCRIPTION

FIG. 1 schematically shows a tubular structure 1, for example, a blood vessel of a patient under analysis. In the relevant art several methods are known to define the surface of a vessel in an object data set. In this example the surface of the vessel is represented by surface triangles which can be generated by means of the so-called marching cubes algorithm which is well known in the art. This marching cubes algorithm is, for example, described in the article: "Marching Cubes: A High Resolution 3D Surface Construction Algorithm", by Lorensen and Cline, Computer Graphics, Vol. 21, No 4, July 1987. For each of these vessel surface points a gradient is calculated. This is performed by means of standard techniques which are described in the cited international patent application EP00/09505 (PHN 17.678).

Surface points with associated (normalized) gradients are referred to as vertices in the following three-dimensional example. FIG. 1 is represented in three dimensional world co-ordinates.

A preferred version of the method according to the invention comprises the following steps. The user first chooses a screen position which is related to the tubular structure. To this end, the tubular structure 1 is represented on a display screen 2 by means of known techniques. The user has a pointing device, such as a mouse or tracker ball, to indicate a screen position by selecting the corresponding pixel on the screen 2 where he or she wishes to start the analysis.

The two-dimensional co-ordinates of the screen position are then transformed to three world co-ordinates, x, y and z referring to an associated starting position 3'. This transformation can be performed in various ways by means of techniques known from the field of computer graphics. A target point 3 lying on the surface of the tubular structure 1 is associated with the starting point 3'. The target point 3 can be found by following the viewing direction V from view point 5 and passing the starting position 3'. The first point encountered on the tubular structure is the target point 3.

Next a plane associated with a self-adjusting probe is defined at the starting position. The plane 4 is derived at the starting position. The sphere (not shown) of the probe is defined to have its center at said starting position 3'. For a detailed description of these steps reference is made to the cited international patent application EP00/09505 (PHN 17.678), which entire document is incorporated herein by reference. In this case a perspective projection is used for the object data set and the direction of the normal of the plane is essentially defined to be the same as the viewing direction V from viewpoint 5. It is to be noted that if an orthographic projection were used for the object data set, the direction of the normal of the plane would essentially be defined to be the same as the direction of the optical axis Z.

The next steps are directed to finding the vertex closest to the plane 4. To this end, a number of vertices forming part of the surface of the tubular structure in the vicinity of the target position 3 are selected. Preferably all vertices at one side of the plane 4 are selected. In this example the selected vertices lie at the positive (=right hand) side of the plane. Now all selected vertices are projected on the plane 4. Subsequently, there is performed a sub-selection consisting of those selected vertices which, when projected on the plane 4, lie at a certain maximum distance from the center of the sphere or the starting position 3' on the plane 4. The projection is performed parallel to the normal of the plane or the viewing direction. A suitable ceiling value for said distance can, for example, be derived from the length of the triangle edges. This is described in the article "Semi-Automatic Shape Extraction from Tube-like Geometry" by J. Bruijns, published in B. Girod, G. Greiner, H. Niemann, H.-P. Seidel (Eds.), Vision Modelling and Visualisation 2000, Proceedings, November 22–24, 2000, Saarbruecken.

In other words, the sub selection consists of vertices which, when projected on the plane 4, lie within a circle on the plane 4 which has the sphere center for its center and has a radius equal to the ceiling value. For ease of explanation the associated circle on the plane is denoted by a thick line 4a in FIG. 1.

Finally, from the sub selection the vertex having the smallest distance to the plane is selected. From FIG. 1 it can be seen that this is vertex 6, which is also generally denoted as the first surface point. The projection of the vertex 6 along the viewing direction onto the plane 4 corresponds to a position 6' falling within area 4a. Vertex 7, though lying closer to the plane 4, does not fulfil the requirement of falling within the area 4a when projected on the plane 4 and is, therefore, ruled out. The vertex 6 is now defined as the new starting position for the self-adjusting probe and is referred to as the first surface point.

According to a detailed version of the method according to the invention further steps are directed to calculating a radius for the sphere based on the data. Such a radius should comply with the important requirement that the sphere radius should be slightly greater than the radius of the tubular structure under analysis.

Therefore, a second surface point which lies essentially across from the first surface point at the opposite side of the tubular structure is determined. A radius for the sphere can then be calculated based on the distance between the first and the second surface point.

Said detailed version is illustrated in FIG. 2, which shows a cross section through the vessel 1. All vertices are shown as dots with associated normal vectors.

The method comprises the first step of defining a plane 8 which is positioned at the first surface point 6. Generally speaking, the direction of the normal vector of the plane is defined essentially to oppose the gradient vectors of the surface points in the neighbourhood of the first surface point. Alternatively, the direction of the normal vector of the plane can be defined essentially so as to oppose the gradient vector of the first surface point. Next, all vertices having a gradient direction or normal essentially opposing the gradient direction or normal of the first surface point 6 are selected and projected on the plane. This can, for example, be achieved by first setting the direction of the plane normal $v_8$ so as to oppose the direction of the normal $v_6$ of the vertex 6 and selecting all vertices at the positive side of plane 8.

Now a sub-selection consisting of selected vertices which satisfy the following requirements is defined:
(a) the distance of the projection of the surface point on the plane to center of the plane is equal to or less than a certain ceiling value; and
(b) the inner product of the gradient vector of the surface point and the normal of the plane is larger than zero.

With respect to the criterion (a) all selected vertices are projected on the temporary plane 8. Subsequently, there is performed a sub-selection which consists of those selected vertices which, when projected on the plane 8, lie at a certain maximum distance from the center of the plane formed by the first surface point: the vertex 6. For a suitable ceiling value for said distance reference is made to the cited article in Vision Modelling and Visualisation 2000. For ease of explanation the associated circle on the plane 8 is shown as a thick line in 8a FIG. 2.

With respect to the criterion (b) the inner product is calculated of all vertices in the sub selection and only those vertices for which the inner product of the associated gradient vector and the normal v8 of the plane is larger than zero are maintained in the sub selection. Now only those vertices having a normal direction similar to that of the plane normal $v_8$ are selected.

Finally, from the sub selection vertex 9 is selected as having the smallest distance to the plane 8. Hereinafter the vertex 9 is generally denoted as the second surface point.

Based on the first and second surface points, a first estimate $r_1$ for the radius of the vessel 1 can be calculated as follows:

$$r_1=(d_{1,2})*(1-0.5ip) \quad (1)$$

wherein $d_{1,2}$ is the distance between the first and second surface points 6 and 9;

ip is the inner product of v6 and v9, i.e. the vectors associated with the surface points 6 and 9.

A final value r for the radius can now be calculated according to:

$$r=sf*r_1 \quad (2)$$

wherein sf is a safety factor >1. The resulting sphere radius r is most likely larger than the radius of the vessel under analysis.

Following the foregoing explanation of the method according to the invention, a skilled person will be able to translate the steps of the method into a computer program to carry out the method.

Summarizing the invention refers to a method for analyzing an object data set in a multi-dimensional space comprising a tubular structure. This method is especially useful in the field of medical diagnostics and treatment where the object notably is a patient to be examined. All kinds of tubular structures can be analyzed, such as blood vessels, brain cell structures, neuron cell structures, etc. In analyzing blood vessels the method according to the invention allows for accurate determination of the size and diameter of a blood vessel which is essential for correct diagnosis of, for example, a stenosis or an aneurysm and safe treatment thereof.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of analyzing an object data set comprising points in a multi-dimensional space, in which data set a tubular structure occurs, said method comprising the steps of:
    a) choosing a position related to the tubular structure;
    b) determining the multi-dimensional co-ordinates of a starting position associated with said screen position;
    c) deriving a plane through said starting position having its normal directed to the tubular structure;
    d) determining a surface point of the tubular structure as a target position associated with the starting position;
    e) selecting a number of points forming part of the surface of the tubular structure in the vicinity of the target position;
    f) determining the surface point in the selection which is closest to the plane; and
    g) using the surface point determined in the step f) as a new starting position:
    wherein the step (f) also comprises the steps of:
    1) projecting the selected surface points on the plane;
    2) defining a sub-selection which includes selected surface points whose projection on the plane lies at a distance from the starting position which is equal to or less than a certain ceiling value; and
    3) selecting from the sub selection the first surface point having the smallest distance to the plane.

2. A method as claimed in claim 1, wherein the data set is represented on a display screen and wherein the first position related to the tubular structure is chosen on the display screen.

3. A method as claimed in claim 1, wherein the step (e) also comprises the step of selecting all surface points at one side of the plane.

4. A method as claimed in claim 1, further comprising the steps of:
    h) determining a second surface point lying essentially across the first surface point at the opposite side of the tubular structure; and
    i) calculating a radius for the sphere based on the distance between the first surface point and the second surface point.

5. A method as claimed in claim 4, wherein the step (h) also comprises the steps of:
    1) defining a plane such that the direction of the normal vector of the plane essentially opposes the gradient vectors of the surface points in the neighbourhood of the first surface point;
    2) calculating a gradient to the surface for the surface points;
    3) selecting all surface points having a gradient direction essentially opposing the gradient direction of the first surface point;
    4) projecting the selected surface points on the plane;
    5) defining a sub-selection consisting of selected surface points for which:
        (a) the distance of the projection of the surface point on the plane to the center of the plane is equal to or less than a certain ceiling value; and
        (b) the inner product of the gradient vector of the surface point and the normal of the plane is larger than zero; and
    6) selecting from the sub-selection the second surface point having the smallest distance to the plane.

6. A method as claimed in claim 5, wherein the step (i) comprises the step of: calculating a first value $r_1$ for the radius according to:

$$r_1=(d_{1,2})*(1-0.5ip)$$

wherein $d_{1,2}$ is the distance between the first and second surface points ip is the inner product of the gradient vectors associated with the first and second surface points.

7. A method as claimed in claim 6, wherein the step (j) also comprises the step of:

calculating a further value r for the radius according to:

$$r=sf*r_1$$

wherein sf is a safety factor >1.

* * * * *